(12) United States Patent  (10) Patent No.: US 11,714,167 B2
Feng et al.  (45) Date of Patent: Aug. 1, 2023

(54) LIDAR ADAPTER FOR USE WITH LIDAR CHIP

(71) Applicant: SiLC Technologies, Inc., Monrovia, CA (US)

(72) Inventors: Dazeng Feng, El Monte, CA (US); Mehdi Asghari, La Canada Flintridge, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 880 days.

(21) Appl. No.: 16/547,522

(22) Filed: Aug. 21, 2019

(65) Prior Publication Data

US 2021/0055388 A1 Feb. 25, 2021

(51) Int. Cl.
*G01S 7/48* (2006.01)
*G01S 7/481* (2006.01)
*G01S 17/58* (2006.01)
*G01S 17/08* (2006.01)

(52) U.S. Cl.
CPC ............ *G01S 7/4812* (2013.01); *G01S 17/08* (2013.01); *G01S 17/58* (2013.01)

(58) Field of Classification Search
CPC ......... G01S 7/4812; G01S 17/08; G01S 17/58
See application file for complete search history.

(56) References Cited

U.S. PATENT DOCUMENTS

| 9,157,790 | B2 | 10/2015 | Shpunt et al. |
| 9,519,052 | B2* | 12/2016 | Gusev ................. G01C 15/002 |
| 10,281,322 | B2* | 5/2019 | Doylend ............... G01S 7/4813 |
| 2007/0024849 | A1 | 2/2007 | Carrig et al. |
| 2015/0378012 | A1 | 12/2015 | Sayyah et al. |
| 2017/0153319 | A1 | 6/2017 | Villeneuve et al. |
| 2019/0018139 | A1 | 1/2019 | Sayyah et al. |

OTHER PUBLICATIONS

Copenheaver, Blaine R., International Search Report and Written Opinion, PCT/US2020/047530, International Searching Authority, United States Patent and Trademark Office, dated Nov. 4, 2020.

(Continued)

*Primary Examiner* — Elias Desta
(74) *Attorney, Agent, or Firm* — Gavrilovich, Dodd & Lindsey LLP

(57) ABSTRACT

A LIDAR system includes a LIDAR chip configured that outputs a LIDAR output signal. The LIDAR system also includes a LIDAR adapter that receives the LIDAR output signal from the LIDAR chip and also outputs the LIDAR output signal from the LIDAR system and toward a sample region in a field of view. The LIDAR adapter also receives a LIDAR return signal that includes light from the LIDAR output signal after the LIDAR output signal is reflected by an object located in the sample region. The LIDAR output signal and the LIDAR return signal travel the same optical pathway between the LIDAR adapter and the object. The LIDAR adapter is also configured to output a LIDAR input signal that is received by the LIDAR chip and includes or consists of light from the LIDAR return signal. The LIDAR input signal and the LIDAR output signal travel different optical pathways between the LIDAR adapter and the LIDAR chip.

15 Claims, 5 Drawing Sheets

(56) References Cited

OTHER PUBLICATIONS

Baghmisheh, B. B., "Chip-scale Lidar" University of California, Berkeley, Jan. 19, 2017, Technical Report No. UCB/EECS-2017-4, http://www2.eecs.berkeley.edu/Pubs/TechRpts/2017/EECS-2017-4.html.

Issakov, V. (2010). Radar Systems, Ch. 2. In Microwave Circuits for 24GHz Automotive Radar in Silicon-based Technologies. Berlin Heidelberg: Springer-Verlag.

Li, L. (2014). Time-of-Flight Camera—An Introduction. TI Technical White Paper SLOA190B.

Lindner, Nora, International Preliminary Report on Patentability and Written Opinion, PCT/US2020/047530, International Bureau of WIPO, dated Mar. 3, 2022.

\* cited by examiner

LIDAR ADAPTER FOR USE WITH LIDAR CHIP

FIELD

The invention relates to optical devices. In particular, the invention relates to LIDAR systems.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) sensors are used to construct a 3D image of a target scene by illuminating the scene with laser light and measuring the returned signal.

Frequency Modulated Continuous Wave (FMCW) is an example of a coherent detection method can be used for LIDAR applications. The FMCW technique is capable of determining distance and/or radial velocity between an object and the LIDAR system with a single measurement. Additionally, FMCW techniques have reduced sensitivity to ambient light and light from other LIDAR systems.

Integrated FMCW LIDAR chip have been proposed. However, these LIDAR chips carry LIDAR output signals and LIDAR return signals on the same waveguide. Due to fabrication limitations, an optical coupler is generally used to separate the LIDAR output signals and LIDAR return signals. This optical coupler is a source of a large level of optical loss in the LIDAR system. This optical coupler limits the ability of LIDAR systems to satisfy the growing demand for increased ranges and precision levels. As a result, there is a need for LIDAR systems with reduced levels of optical loss.

SUMMARY

A LIDAR system includes a LIDAR chip configured that outputs a LIDAR output signal. The LIDAR system also includes a LIDAR adapter that receives the LIDAR output signal from the LIDAR chip and also outputs the LIDAR output signal from the LIDAR system and toward a sample region in a field of view. The LIDAR adapter also receives a LIDAR return signal that includes light from the LIDAR output signal after the LIDAR output signal is reflected by an object located in the sample region. The LIDAR output signal and the LIDAR return signal travel the same optical pathway between the LIDAR adapter and the object. The LIDAR adapter is also configured to output a LIDAR input signal that is received by the LIDAR chip and includes or consists of light from the LIDAR return signal. The LIDAR input signal and the LIDAR output signal travel different optical pathways between the LIDAR adapter and the LIDAR chip.

DESCRIPTION

A LIDAR chip is disclosed that has the LIDAR output signal and the LIDAR input signals carried on different waveguides. A LIDAR adapter is positioned between the LIDAR chip and the field of view. The LIDAR adapter can be configured to receive the LIDAR output signal from the LIDAR chip and to output the LIDAR input signal received by the LIDAR chip. The LIDAR adapter operates on the LIDAR input signal and the LIDAR output signal such that the LIDAR input signal and the LIDAR output signal travel on different optical pathways between the LIDAR adapter and the LIDAR chip but on the same optical pathway between the LIDAR adapter and the field of view. As a result, the LIDAR adapter removes the need for an optical coupler on the LIDAR chip and can accordingly reduce the level of optical loss associated with the LIDAR system.

The LIDAR adapter can be constructed with discrete optical components attached to a base. As a result, the LIDAR adapter can include an optical circulator that separates the LIDAR input signal and the LIDAR output signal. Optical circulators have been ineffective in integrated platforms. As a result, the LIDAR adapter allows a circulator to be effectively combined with a LIDAR chip.

Additionally, LIDAR output signals are often linearly polarized. Reflection of these signal by an object may change the angle of polarization of the returned light. Accordingly, a LIDAR input signal can include light of different linear polarization states. LIDAR data carried in the LIDAR input signal can be lost as a result of this change in polarization state. The use of discrete optical components in a LIDAR adapter simplifies separating the LIDAR input signal into multiple different LIDAR input signals that are each associated with a different polarization state. The LIDAR chip can receive the different LIDAR input signals and process the LIDAR input signals so as to compensate for these polarization state changes. As a result, the LIDAR adapter can reduce the loss of LIDAR data.

Figure 1:
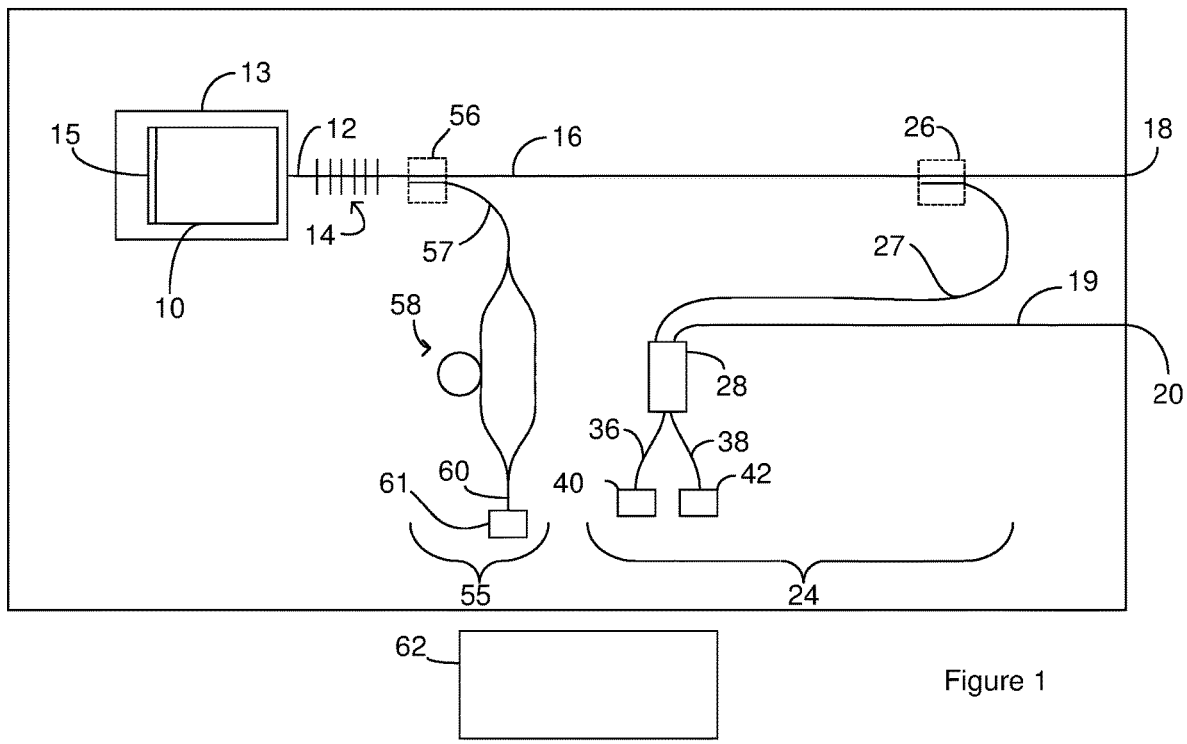
FIG. 1 is a top view of a LIDAR chip that is suitable for use with a LIDAR adapter.

FIG. 1 is a topview of a LIDAR chip that includes a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used such as echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the LIDAR chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal.

The LIDAR output signal travels away from the chip and may be reflected by objects in the path of the LIDAR output signal. The reflected signal travels away from the objects. When the LIDAR output signal is reflected, at least a portion of the light from the reflected signal is returned to an input waveguide 19 on the LIDAR chip as a first LIDAR input signal. The input waveguide 19 includes a facet 20 through which the first LIDAR input signal can enter the input waveguide 19. The portion of the first LIDAR input signal that enters the input waveguide 19 can be considered an incoming LIDAR signal and acts as a comparative signal carried by the input waveguide 19. The input waveguide 19 carries the comparative signal to a light-combining component 28.

The chip includes a data branch 24 where the optical signals that are processed for LIDAR data are generated. The data branch includes a splitter 26 that moves a portion of the outgoing LIDAR signal from the utility waveguide 16 into the data branch. For instance, the splitter 26 moves a portion of the outgoing LIDAR signal from the utility waveguide 16 onto a reference waveguide 27 as a reference signal. The reference waveguide 27 carries the reference signal to the light-combining component 28. Suitable splitters 26 include, but are not limited to, The illustrated splitter 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, optical couplers, and multi-mode interference couplers (MMIs).

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal and the first LIDAR input signal. In contrast, the comparative signal light includes light from the first LIDAR input signal. For instance, the comparative signal can serve as a sample of the first LIDAR input signal. Accordingly, the comparative signal includes or consists of light that has been reflected by an object located off the chip in a sample region in a field of view while the reference signal does not include light that has been reflected by the object. When the chip and the reflecting object are moving relative to one another, the comparative signal and the reference signal may have different frequencies at least partially due to the Doppler effect. As a result, beating occurs between the comparative signal and the reference signal.

The light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC component of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. The functions of the illustrated light-combining component 28 can be performed by more than one optical component.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×1 light-combining component. For instance, the illustrated light light-combining component can be a 2×1 MMI device. In these instances, the chip includes a single detector waveguide that carries the composite sample signal to the light sensor.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zhender interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zhender interferometer will output a sinusoidal control light signal with a fringe pattern. Changes to the frequency of the outgoing LIDAR signal will cause changes to the frequency of the control light signal. Accordingly, the frequency of the electrical control signal output from the control light sensor 61 is a function of the frequency of the outgoing LIDAR signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the first light sensor 40, the second light sensor 42, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 operate the light source 10 such that the laser cavity outputs the outgoing LIDAR signal. The electronics 62 then operate the chip through a series of cycles where LIDAR data is generated for each (radial distance and/or radial velocity between the LIDAR system and a reflecting object). In some instances, the LIDAR system includes one or more mechanisms for steering the direction that the LIDAR output signal travels away from the LIDAR system. The electronics can operate the one or more mechanisms so as to direct the LIDAR output signal to different sample regions in a field of view. The sample regions can each be associated with one of the cycles and/or each cycle can be associated with one of the sample regions. As a result, each LIDAR data result can be associated with one of the sample regions in the field of view. Different sample regions can overlap one another and/or be separated from one another.

Each cycle includes one or more data periods. During each data period, the electronics tune the frequency of the outgoing LIDAR signal. As will be described in more detail below, the electronics can employ output from the control branch in order to control the frequency of the outgoing LIDAR signal such that the frequency of the outgoing LIDAR signal as a function of time is known to the electronics. In some instance, a cycle includes a first data period and a second data period. During the first data period, the electronics 62 can increase the frequency of the LIDAR output signal and during a second sample the electronics 62 can decrease the frequency of the LIDAR output signal. In some instances, the change in frequency of the LIDAR output signal is linear. In one example, the laser cavity is operated so as to output an outgoing LIDAR signal (and accordingly a LIDAR output signal) with a wavelength of 1550 nm. During the first data period, the electronics 62 can linearly increase the frequency of the outgoing LIDAR signal (and accordingly a LIDAR output signal) such that the wavelength decreases from 1550 nm to 1459.98 nm followed by a second data period where the frequency of the outgoing LIDAR signal is linearly decreased from 1459.98 nm to 1550 nm.

When the outgoing LIDAR signal frequency is increased during the first data period, the LIDAR output signal travels away from the LIDAR chip and light from the LIDAR output signal can be reflected by an object positioned in a sample region of a field of view. At least a portion of the reflected light is then returned to the chip in a first LIDAR input signal. As noted above, a portion of the first LIDAR input signal becomes the comparative signal. During the time that the LIDAR output signal and the first LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the first LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second data period, the comparative signal enters the light-combining component with a higher frequency than the reference signal concurrently entering the light-combining component and the difference between the frequency of the comparative signal and the frequency of the reference signal during the second data period is also function of the distance between the LIDAR system and the reflecting object.

In some instances, the difference between the frequency of the comparative signal and the frequency of the reference signal can also be a function of the Doppler effect because relative movement of the LIDAR system and reflecting object can also affect the frequency of the comparative signal. For instance, when the LIDAR system is moving toward or away from the reflecting object and/or the reflecting object is moving toward or away from the LIDAR system, the Doppler effect can affect the frequency of the comparative signal. Since the frequency of the comparative signal is a function of the radial velocity between the reflecting object and the LIDAR system, the difference between the frequency of the comparative signal and the frequency of the reference signal is also a function of the radial velocity between the reflecting object and the LIDAR system. Accordingly, the difference between the frequency of the comparative signal and the frequency of the reference signal is a function of the distance and/or radial velocity between the LIDAR system and the reflecting object.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance and/or radial velocity between the LIDAR system and the reflecting object.

As noted above, the beat frequency is a function of two unknowns; the distance between the LIDAR system and the reflecting object and the relative velocity of the chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the radial velocity between the LIDAR system and the reflecting object and c is the speed of light in air. The use of multiple different data periods permits the electronics 62 to resolve the two unknowns. For instance, the beat frequency determined for the first data period is related to the unknown distance and Doppler contribution and the beat frequency determined for the second data period is also related to the unknown distance and Doppler contribution. The availability of the two relationships allows the electronics 62 to resolve the two unknowns. Accordingly, the distance between the LIDAR system and the reflecting object can be determined without influence from the Doppler effect. Further, in some instances, the electronics 62 use this distance in combination with the Doppler effect to determine the radial velocity between the LIDAR chip and the reflecting object.

In instances where the radial velocity between the LIDAR chip and the reflecting object is zero or very small, the contribution of the Doppler effect to the beat frequency is essentially zero. In these instances, the Doppler effect does not make a substantial contribution to the beat frequency and the electronics 62 can use only the first data period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during a data period, the electronics 62 can have a range of suitable values for the electrical control signal magnitude as a function of time. At multiple different times during a data period, the electronics 62 can compare the electrical control signal magnitude to the range of values associated with the current time in the sample. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

Figure 2:
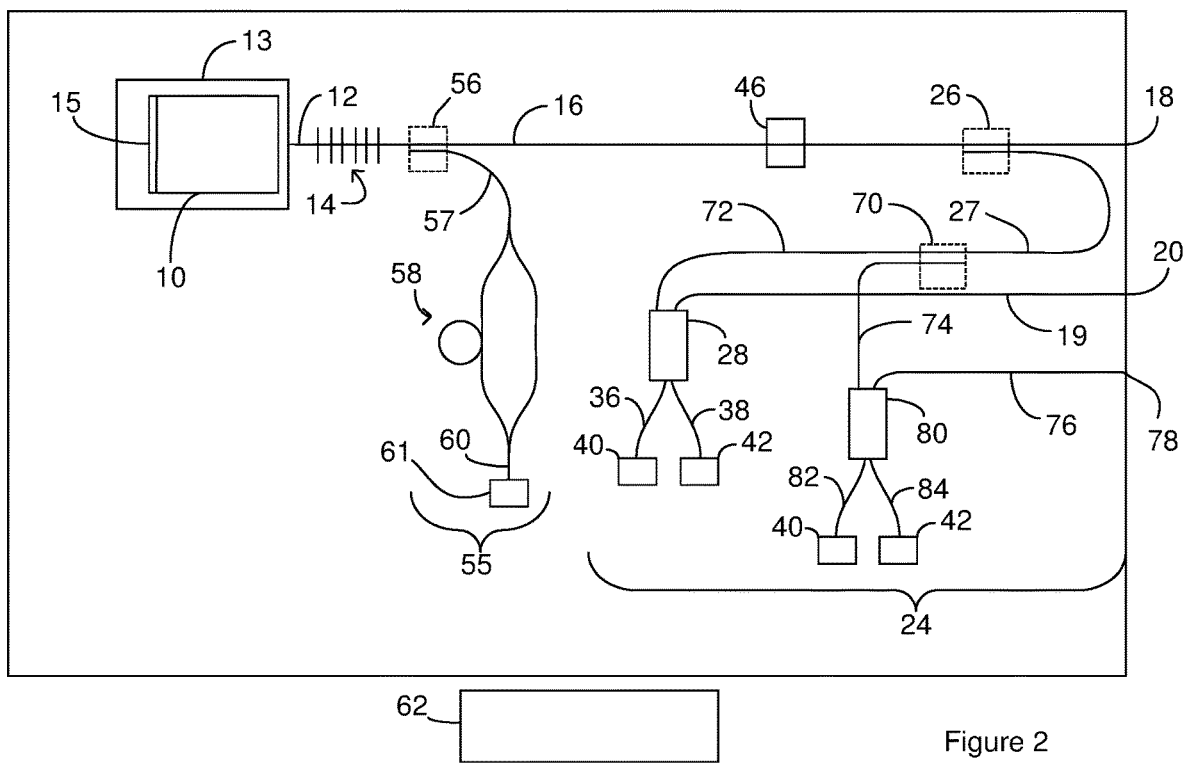
FIG. 2 is a top view of a LIDAR chip configured to receive multiple different LIDAR input signals and is suitable for use with a LIDAR adapter.

The LIDAR chip of FIG. 1 can be modified to receive multiple first LIDAR input signals. For instance, FIG. 2 illustrates the LIDAR chip of FIG. 1 modified to receive two first LIDAR input signals. A splitter 70 is configured to move a portion of the reference signal carried on the reference waveguide 27 onto a first reference waveguide 72 and another portion of the reference signal onto a second reference waveguide 74. Accordingly, the first reference waveguide 72 carries a first reference signal and the second reference waveguide 74 carries a second reference signal. The first reference signal is carried to the light-combining component 28 and processed by the light-combining component 28 as described in the context of FIG. 1. Examples of suitable splitters 70 include, but are not limited to, y-junctions, optical couplers, and multi-mode interference couplers (MMIs).

As described above, a LIDAR output signal that travels away from the chip may be reflected by one or more objects in the path of the LIDAR output signal. The reflected signal travels away from the objects. When the LIDAR output signal travel is reflected, at least a portion of the reflected signal is returned to a second input waveguide 76 on the LIDAR chip as a second LIDAR input signal. The second input waveguide 76 includes a facet 78 through which the first LIDAR input signal can enter the second input waveguide 76. The portion of the second LIDAR input signal that enters the input waveguide 19 acts as a second comparative signal carried by the second input waveguide 76.

The second input waveguide 76 carries the second comparative signal to a second light-combining component 80. Additionally, the second reference waveguide 74 carries the second reference signal to the second light-combining component 80. The second light-combining component 80 combines the second comparative signal and the second reference signal into a second composite signal. The second reference signal includes light from the outgoing LIDAR signal. For instance, the second reference signal can serve as a sample of the outgoing LIDAR signal. The second reference signal can exclude light from the LIDAR output signal and the second LIDAR input signal. In contrast, the second comparative signal includes light from the second LIDAR input signal. For instance, the second comparative signal can serve as a sample of the second LIDAR input signal. Accordingly, the second comparative signal has been reflected by an object located outside of the LIDAR system while the second reference signal has not been reflected. When the chip and the reflecting object are moving relative to one another, the second comparative signal and the second reference signal may have different frequencies at least partially due to the Doppler effect. As a result, beating occurs between the second comparative signal and the second reference signal.

The second light-combining component 80 also splits the resulting second composite signal onto a first detector waveguide 82 and a second detector waveguide 84. The first detector waveguide 82 carries a first portion of the second composite signal to a first light sensor 40 that converts the first portion of the second composite signal to a first electrical signal. The second detector waveguide 84 carries a second portion of the second composite sample signal to a second light sensor 42 that converts the second portion of the composite sample signal to a second electrical signal. Examples of suitable light sensors include germanium photodiodes (PDs), and avalanche photodiodes (APDs).

The second light combining component 80, the associated first light sensor 40 and the associated second light sensor 42 can be connected as a balanced photodetector that outputs a second electrical data signal. For instance, the second light combining component 80, the associated first light sensor 40 and the associated second light sensor 42 can be connected such that the DC component of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable second light-combining component 80 is a Multi-Mode Interference (MMI) device such as a 2×2 MMI device. Other suitable second light-combining components 80 include, but are not limited to, adiabatic splitters, and directional coupler. The functions of the illustrated second light-combining component 80 can be performed by more than one optical component.

The electronics 62 can operate one or more components on the chip to generate LIDAR outputs signals over multiple different cycles as described above. Additionally, the electronics 62 can process the second electrical signal as described above in the context of FIG. 1. Accordingly, the electronics can generate second LIDAR data results from the second composite signals and/or LIDAR data results from the composite signals. As a result, the second LIDAR data results and/or the LIDAR data results can be generated from the same LIDAR output signal.

Figure 3:
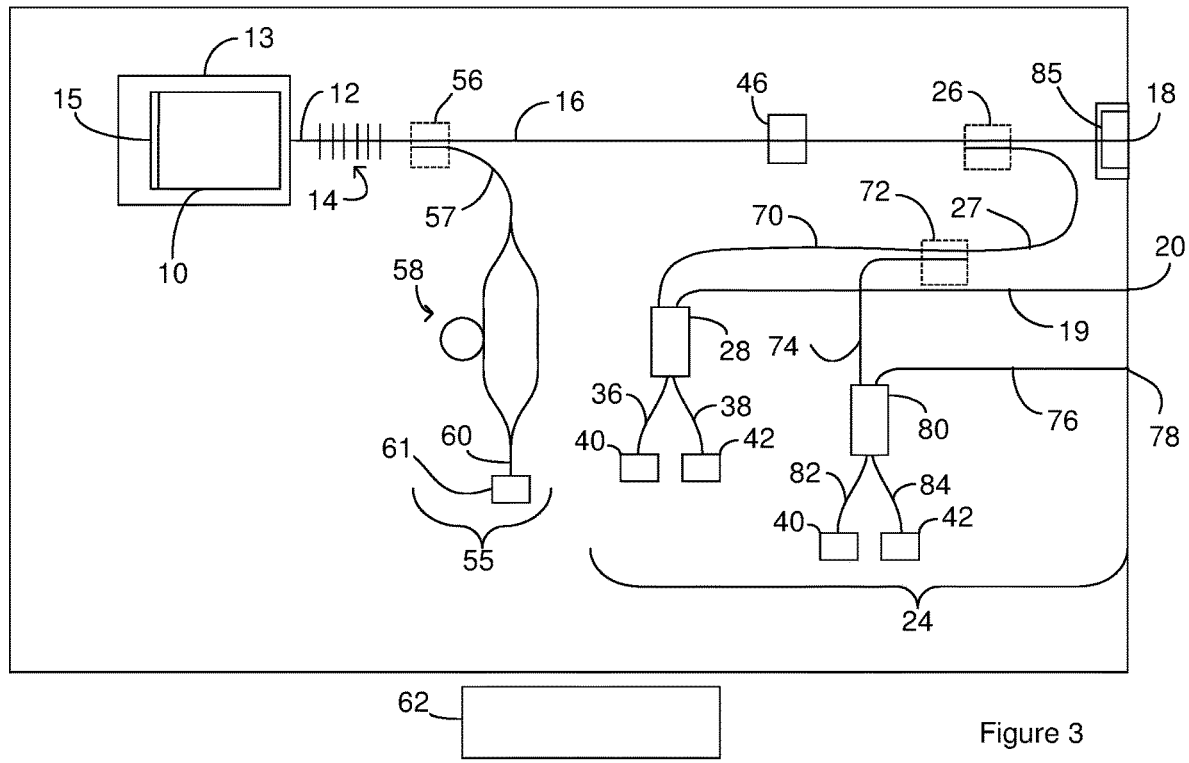
FIG. 3 is a top view of a LIDAR chip configured to receive multiple different LIDAR input signals and is suitable for use with a LIDAR adapter.

The LIDAR chips can be modified to include other components. For instance, FIG. 3 illustrates the LIDAR chip of FIG. 2 modified to include an amplifier 85 positioned at an edge of the LIDAR chip such that the utility waveguide 16 terminates at a facet at the amplifier 85. The amplifier 85 can be operated by the electronics 62. As a result, the electronics 62 can control the power of the LIDAR output signal. Suitable amplifiers include, but are not limited to, Erbium-doped fiber amplifiers (EDFAs), Erbium-doped waveguide amplifiers (EDWAs), and Semiconductor Optical Amplifiers (SOAs).

Figure 4:
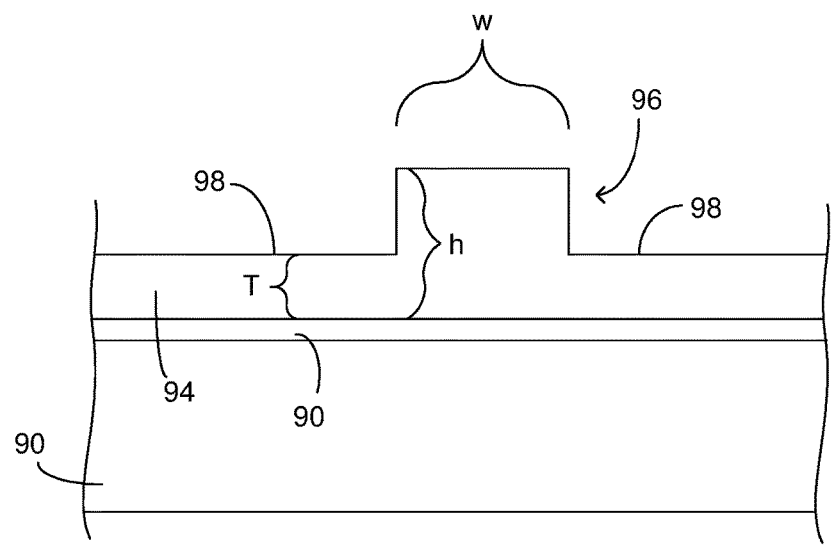
FIG. 4 is a cross-section of a LIDAR chip according to FIG. 1 through 3 constructed from a silicon-on-insulator wafer.

Suitable platforms for the LIDAR chips include, but are not limited to, silica, indium phosphide, and silicon-on-insulator wafers. FIG. 4 is a cross-section of portion of a chip constructed from a silicon-on-insulator wafer. A silicon-on-insulator (SOI) wafer includes a buried layer 90 between a substrate 92 and a light-transmitting medium 94. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 through FIG. 3 can be positioned on or over the top and/or lateral sides of the substrate.

The portion of the chip illustrated in FIG. 4 includes a waveguide construction that is suitable for use with chips constructed from silicon-on-insulator wafers. A ridge 96 of the light-transmitting medium extends away from slab regions 98 of the light-transmitting medium. The light signals are constrained between the top of the ridge and the buried oxide layer.

The dimensions of the ridge waveguide are labeled in FIG. 4. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1 μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 4 is suitable for all or a portion of the waveguides on LIDAR chips constructed according to FIG. 1 through FIG. 3.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1, 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Amplifiers that are interfaced with waveguides on a chip can be a component that is separate from the chip and then attached to the chip. For instance, the amplifier can be a Semiconductor Optical Amplifier (SOA) or Booster Optical Amplifier (BOA) as a discrete component. Examples of discrete component amplifiers include, but are not limited to, BOA1007C manufactured by Thorlabs located in Newton, N.J., USA. These amplifiers can be centrally located on the LIDAR chip. Alternately, all or a portion the waveguides that terminate at an amplifier 18 located at an edge of the LIDAR chip such that the amplifier receives light that passes through the amplifier. As an alternative to an amplifier that is a discrete component, all or a portion of the amplifiers can be integrated with the LIDAR chip. For instance, examples of amplifiers that are interfaced with ridge waveguides on a chip constructed from a silicon-on-insulator wafer can be found in U.S. patent application Ser. No. 62/814,844, U.S. Pat. Nos. 9,025,241, and 7,542,641 each of which is incorporated herein in its entirety.

Construction of optical gratings that are integrated with a variety of optical device platforms are available. For instance, a Bragg grating can be formed in a ridge waveguides by forming grooves in the top of the ridge and/or in the later sides of the ridge.

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the laser cavity is shown as being positioned on the chip, all or a portion of the laser cavity can be located off the chip. For instance, the utility waveguide 16 can terminate at a second facet through which the outgoing LIDAR signal can enter the utility waveguide 16 from a laser cavity located off the chip.

The LIDAR chips can be used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 5:
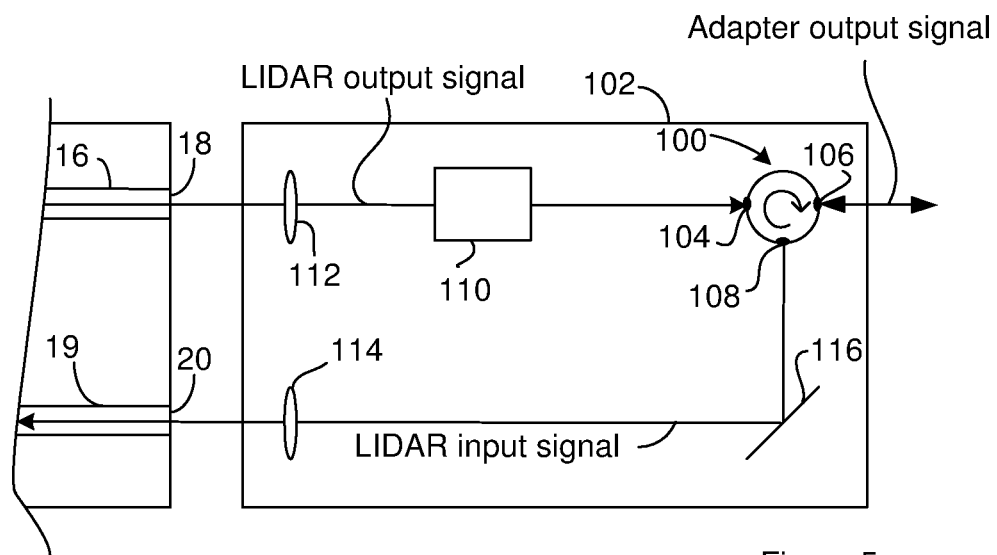
FIG. 5 is a top view of a LIDAR adapter.

An example of a LIDAR adapter that is suitable for use with the LIDAR chip of FIG. 1 is illustrated in FIG. 5. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 16 of the LIDAR chip and exits from the second port 106. The LIDAR adapter can be configured such that the output of the LIDAR output signal from the second port 106 can also serve as the output of the LIDAR output signal from the LIDAR adapter. As a result, the LIDAR output signal can be output from the LIDAR adapter such that the LIDAR output signal is traveling toward a sample region in the field of view.

The LIDAR output signal output from the LIDAR adapter can serve as an adapter output signal that includes, consists of, or consists essentially of light from the LIDAR output signal received from the LIDAR chip. Accordingly, the adapter output signal may be the same or substantially the same as the LIDAR output signal received from the LIDAR chip. However, there may be differences between the adapter output signal and the LIDAR output signal received from the LIDAR chip. For instance, the LIDAR output signal can experience optical loss as it travels through the LIDAR adapter.

When an object in the sample region reflects the adapter output signal, at least a portion of the reflected light travels back to the circulator 100 as a LIDAR return signal. The LIDAR return signal enters the circulator 100 through the second port 106. FIG. 5 illustrates the LIDAR output signal and the LIDAR return signal traveling between the LIDAR adapter and the sample region along the same optical path.

The LIDAR return signal exits the circulator 100 through the third port 108 and is directed to the input waveguide 19 on the LIDAR chip. Accordingly, light from the LIDAR return signal can serve as the first LIDAR input signal and the first LIDAR input signal includes or consists of light from the LIDAR return signal. Accordingly, the adapter output signal and the first LIDAR input signal travel between the LIDAR adapter and the LIDAR chip along different optical paths.

As is evident from FIG. 5, the LIDAR adapter can include optical components in addition to the circulator 100. For instance, the LIDAR adapter can include components for directing and controlling the optical path of the LIDAR output signal and the LIDAR return signal. As an example, the adapter of FIG. 5 includes an optional amplifier 110 positioned so as to receive and amplify the LIDAR output signal before the LIDAR output signal enters the circulator 100. The amplifier 110 can be operated by the electronics 62 allowing the electronics 62 to control the power of the LIDAR output signal.

FIG. 5 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 20 of the input waveguide 19.

The LIDAR adapter can also include one or more direction changing components such as mirrors. FIG. 5 illustrates the LIDAR adapter including a mirror as a direction-changing component 116 that redirects the LIDAR return signal from the circulator 100 to the facet 20 of the input waveguide 19.

The LIDAR chips include one or more waveguides that constrains the optical path of one or more light signals. While the LIDAR adapter can include waveguides, the optical path that the LIDAR return signal and the LIDAR output signal travel between components on the LIDAR adapter and/or between the LIDAR chip and a component on the LIDAR adapter can be free space. For instance, the LIDAR return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the LIDAR return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the LIDAR return signal can include light of different linear polarization states. For instance, a first portion of a LIDAR return signal can include light of a first linear polarization state and a second portion of a LIDAR return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 6:
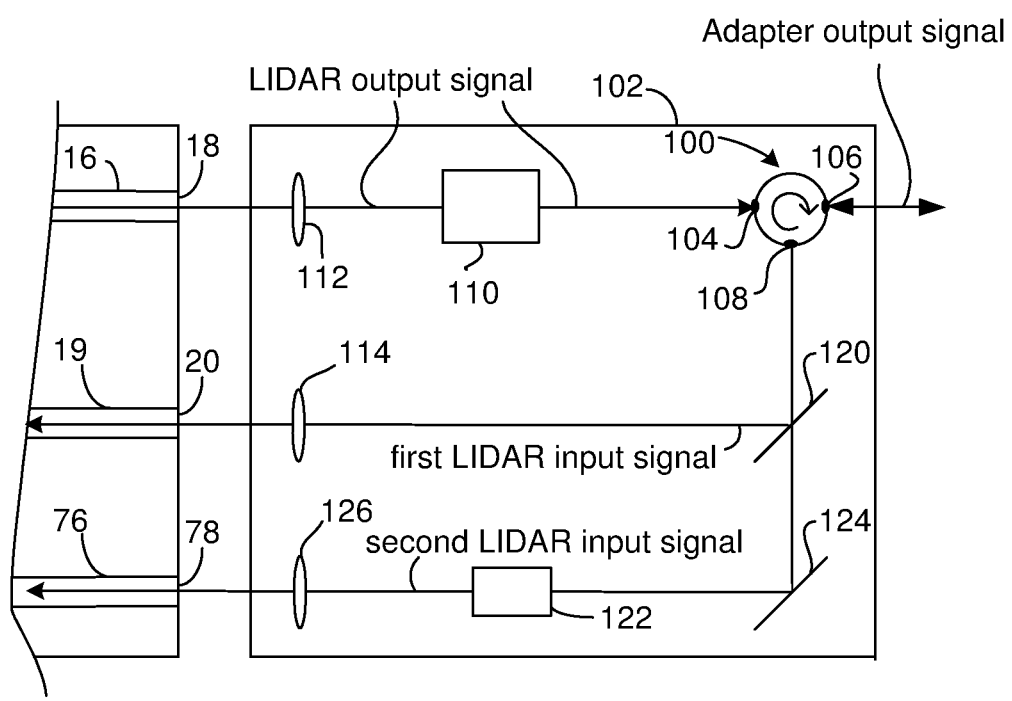
FIG. 6 is a top view of a LIDAR adapter for use with a LIDAR system providing polarization compensation.

FIG. 6 illustrates the LIDAR system of FIG. 5 modified such that the LIDAR adapter is suitable for use with the LIDAR chip of FIG. 2 or FIG. 3. The LIDAR adapter includes a beamsplitter 120 that receives the LIDAR return signal from the circulator 100. The beamsplitter 120 splits the LIDAR return signal into a first portion of the LIDAR return signal and a second portion of the LIDAR return signal. Suitable beamsplitters include, but are not limited to, Wollaston prisms, and MEMs-based beamsplitters.

The first portion of the LIDAR return signal is directed to the input waveguide 19 on the LIDAR chip and serves as the first LIDAR input signal described in the context of FIG. 1 through FIG. 5. The second portion of the LIDAR return signal is directed a polarization rotator 122. The polarization rotator 122 outputs a second LIDAR input signal that is directed to the second input waveguide 76 on the LIDAR chip and serves as the second LIDAR input signal described in the context of FIG. 2 through FIG. 5.

The beamsplitter 120 can be a polarizing beam splitter. One example of a polarizing beamsplitter is constructed such that the first portion of the LIDAR return signal has a first polarization state but does not have or does not substantially have a second polarization state and the second portion of the LIDAR return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the LIDAR return signal and/or the second portion of the LIDAR return signal. For instance, the polarization rotator 122 shown in FIG. 6 can be configured to change the polarization state of the second portion of the LIDAR return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this discussion). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multimode interference couplers.

Since the outgoing LIDAR signal is linearly polarized, the first reference signals can have the same linear polarization angle as the second reference signals. Additionally, the components on the LIDAR adapter can be selected such that the first reference signals, the second reference signals, the comparative signals and the second comparative signals each have the same polarization state. In the example disclosed in the context of FIG. 6, the first comparative signals, the second comparative signals, the first reference signals, and the second reference signals can each have light of the first polarization state.

As a result of the above configuration, the composite signals and the second composite signals each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 6 is described in the context of components being arranged such that the first comparative signals, the second comparative signals, the first reference signals, and the second reference signals each have the first polarization state, other configurations of the components in FIG. 6 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the LIDAR return signal has the first polarization state and the first portion of the LIDAR return signal has the second polarization state, the polarization rotator receives the first portion of the LIDAR return signal, and the outgoing LIDAR signal can have the second polarization state. In this example, the first LIDAR input signal and the second LIDAR input signal each has the second polarization state.

The above system configurations result in the first portion of the LIDAR return signal and the second portion of the LIDAR return signal being directed into different composite signals. As a result, since the first portion of the LIDAR return signal and the second portion of the LIDAR return signal are each associated with a different polarization state but electronics can process each of the composite signals, the LIDAR system compensates for changes in the polarization state of the LIDAR return signal in response to reflection of the LIDAR output signal.

The LIDAR adapter of FIG. 6 can include additional optical components including passive optical components. For instance, the LIDAR adapter can include an optional third lens 126. The third lens 126 can be configured to couple the second LIDAR input signal at a desired location. In some instances, the third lens 126 focuses or collimates the second LIDAR input signal at a desired location. For instance, the third lens 126 can be configured to focus or collimate the second LIDAR input signal on the facet 78 of the second input waveguide 76. The LIDAR adapter also includes one or more direction changing components 124 such as mirrors and prisms. FIG. 6 illustrates the LIDAR adapter including a mirror as a direction changing component 124 that redirects the second portion of the LIDAR return signal from the circulator 100 to the facet 78 of the second input waveguide 76 and/or to the third lens 126.

Figure 7:
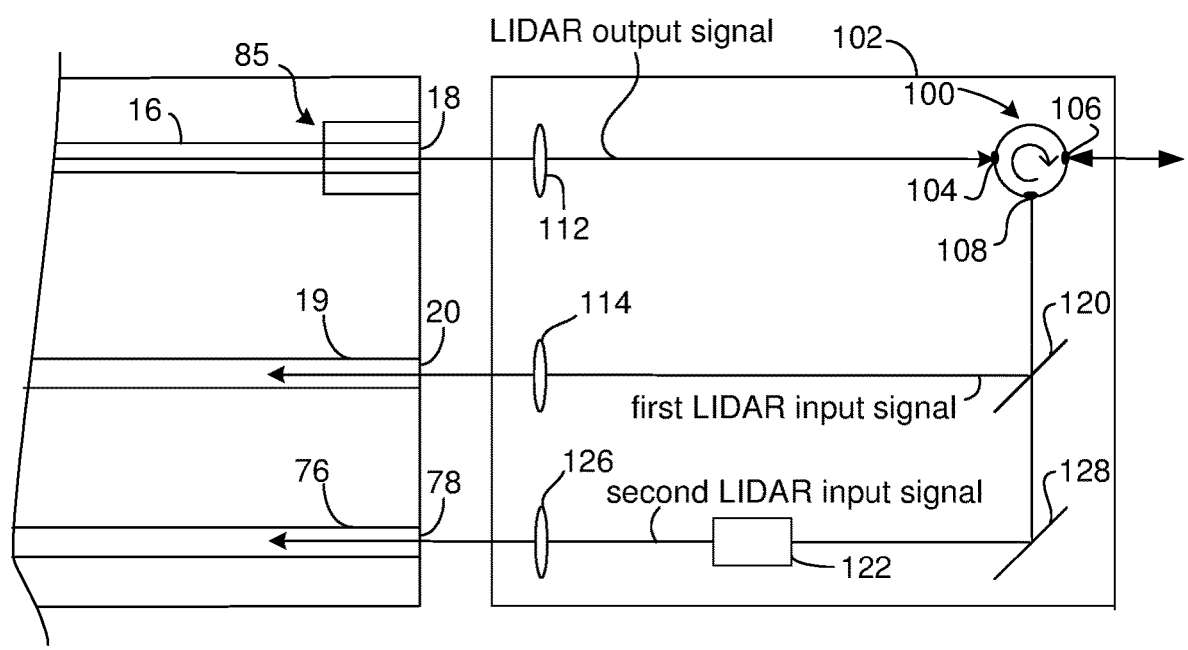
FIG. 7 is a top view of a LIDAR adapter that includes only passive optical components and is suitable for use with a LIDAR system providing polarization compensation.

FIG. 7 illustrates the LIDAR system of FIG. 6 modified such that the LIDAR adapter is suitable for use with the LIDAR chip of FIG. 2 or FIG. 3. The LIDAR output signal is not amplified on the LIDAR adapter of FIG. 7. FIG. 7 illustrates the LIDAR adapter used with the LIDAR chip of FIG. 3. Accordingly, an amplifier 85 operated by the electronics is positioned on the LIDAR chip rather than the LIDAR adapter. In this situation, the active components of the LIDAR system that are operated by the electronics and/or that provide electrical output to the electronics are positioned on the LIDAR chip while the passive components are located on the LIDAR adapter. Accordingly, an example of the LIDAR system has a LIDAR adapter that includes discrete passive components on a base and excludes integrated components on the base while the LIDAR chip includes a combination of discrete and integrated components or includes only integrated optical components.

Figure 8:
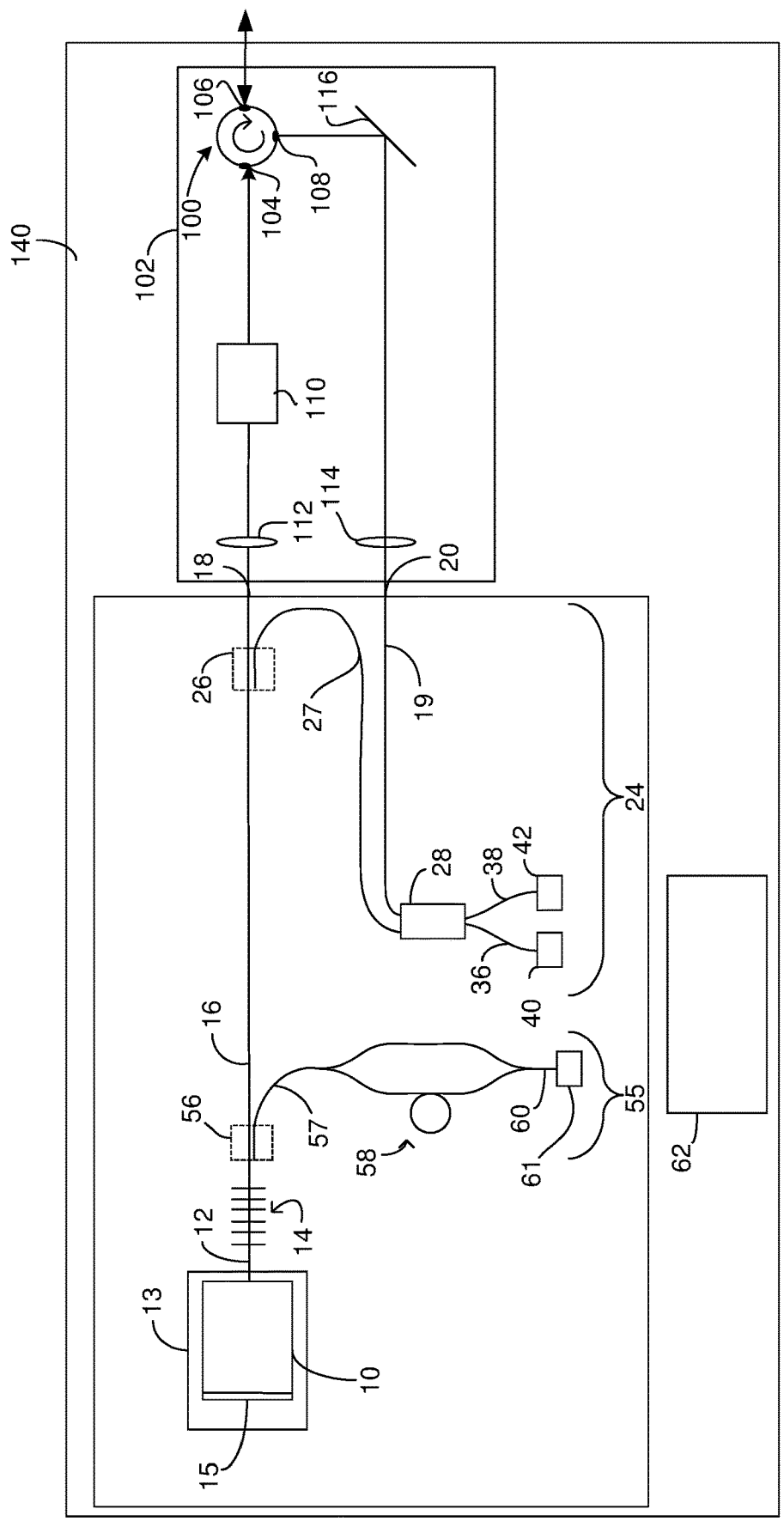
FIG. 8 is a topview of a LIDAR system that includes the LIDAR chip and electronics of FIG. 1 and the LIDAR adapter of FIG. 5 on a common support.

The LIDAR chip, electronics, and the LIDAR adapter can be positioned on a common mount. Suitable common mounts include, but are not limited to, glass plates, metal plates, silicon plates and ceramic plates. As an example, FIG. 8 is a topview of a LIDAR system that includes the LIDAR chip and electronics 62 of FIG. 1 and the LIDAR adapter of FIG. 5 on a common support 140. Although the electronics 62 are illustrated as being located on the common support, all or a portion of the electronics can be located off the common support. Suitable approaches for mounting the LIDAR chip, electronics, and/or the LIDAR adapter on the common support include, but are not limited to, epoxy, solder, and mechanical clamping.

Although the LIDAR system is shown as operating with a LIDAR chip that outputs a single LIDAR output signal, the LIDAR chip can be configured to output multiple LIDAR output signals. Multiple LIDAR adapters can be used with a single LIDAR chip and/or a LIDAR adapter can be scaled to receive multiple LIDAR output signals.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A light detection and ranging (LIDAR) system, comprising:
a LIDAR chip configured to output a LIDAR output signal; and
a LIDAR adapter configured to receive the LIDAR output signal from the LIDAR chip and to output an adapter output signal that includes light from the LIDAR output signal, and
the LIDAR adapter being configured to receive a LIDAR return signal that includes light from the adapter output signal that was reflected by an object located outside of the LIDAR system,
the LIDAR adapter configured such that the adapter output signal and the LIDAR return signal travel the same optical pathway between the LIDAR adapter and the object,
the LIDAR adapter configured to output a LIDAR input signal that is received by the LIDAR chip,
the LIDAR input signal including light from the LIDAR return signal, and the LIDAR input signal and the LIDAR output signal traveling different optical pathways between the LIDAR adapter and the LIDAR chip
the LIDAR adapter includes discrete optical components attached to a substrate such that light signals travel between the different optical components through free space and the LIDAR chip includes integrated optical components integrated with a chip substrate, the chip substrate and the substrate being separate components.

2. The LIDAR system of claim 1, wherein the LIDAR input signal carries LIDAR data indicating a radial velocity and/or distance between the LIDAR system and the object.

3. The LIDAR system of claim 1, wherein the LIDAR chip and the LIDAR adapter are each bonded to a common base.

4. The LIDAR system of claim 1, wherein the LIDAR input signal is one of several different LIDAR input signals that are each output by the LIDAR adapter and received by the LIDAR chip, each of the LIDAR input signals including light from the LIDAR return signal.

5. The LIDAR system of claim 4, wherein different LIDAR input signals are associated with different linear polarization states.

6. The LIDAR system of claim 1, wherein the LIDAR adapter is configured to divide the LIDAR return signal into a first portion of the LIDAR return signal and a second portion of the LIDAR return signal where the first portion of the LIDAR return signal and the second portion of the LIDAR return signal carry light with different linear polarization states.

7. The LIDAR system of claim 6, wherein the LIDAR input signal is one of several different LIDAR input signals that are each output by the LIDAR adapter and received by the LIDAR chip,
a first one of the LIDAR input signals including light from the first portion of the LIDAR return signal and excluding light from the second portion of the LIDAR return signal,
a second one of the LIDAR input signals including light from the second portion of the LIDAR return signal and excluding light from the first portion of the LIDAR return signal, and
the first LIDAR input signal and the second LIDAR input signal carrying light of the same linear polarization state.

8. The LIDAR system of claim 1, wherein the LIDAR adapter includes an optical circulator and the adapter output signal is output from the LIDAR adapter through a port of the optical circulator.

9. The LIDAR system of claim 1, wherein the LIDAR adapter excludes active optical components.

10. The LIDAR system of claim 1, wherein the chip substrate and the substrate are spaced apart.

11. The LIDAR system of claim 1, wherein the wherein the LIDAR adapter includes an optical circulator that receives the LIDAR output signal and outputs the adapter output signal.

12. The LIDAR system of claim 1, wherein the LIDAR output signal travels through a free space region between the LIDAR adapter and the LIDAR chip.

13. The LIDAR system of claim 1, wherein the light signals traveling through free space travel through an atmosphere in which the LIDAR chip and the LIDAR adapter is positioned.

14. The LIDAR system of claim 1, wherein the LIDAR chip and the LIDAR adapter are separate components.

15. The LIDAR system of claim 1, wherein the LIDAR chip and the LIDAR adapter are spaced apart.

* * * * *